Dec. 5, 1944.  E. J. TRIMBEY ET AL  2,364,405
METHOD AND APPARATUS FOR SEPARATING FOREIGN
MATTER FROM PAPER MAKING MATERIAL
Filed Jan. 23, 1940  2 Sheets-Sheet 1

INVENTOR.
Edward J. Trimbey and
George H. Walker.
BY Walter C. Ross.
ATTORNEY.

Dec. 5, 1944.　　　E. J. TRIMBEY ET AL　　　2,364,405
METHOD AND APPARATUS FOR SEPARATING FOREIGN
MATTER FROM PAPER MAKING MATERIAL
Filed Jan. 23, 1940　　　2 Sheets-Sheet 2

INVENTOR.
Edward J. Trimbey and
BY George H. Walker.
ATTORNEY.

Patented Dec. 5, 1944

2,364,405

UNITED STATES PATENT OFFICE 2,364,405

METHOD AND APPARATUS FOR SEPARATING FOREIGN MATTER FROM PAPERMAKING MATERIAL

Edward J. Trimbey and George K. Walker, Glens Falls, N. Y.; said Walker assignor to said Trimbey Application January 23, 1940, Serial No. 315,257

10 Claims. (Cl. 92—28)

This invention relates to improvements in the art of removing or separating foreign matter from liquid suspensions and the like.

The principal objects of this invention are directed to novel improvements in methods of and apparatus for continuously removing foreign matter or relatively heavy impurities from liquid suspensions, which novel method and apparatus are characterized by simplicity and efficiency in operation, all to the end that the separating or removal of unwanted matter and substances is readily and economically accomplished.

The novel features of the invention are adapted for broad application where it is desired to bring about the removal of grit, sand, or other foreign matter and impurities from liquids such as from unfiltered water used for industrial purposes and finds one very desirable and practical application in the removal of foreign materials from pulp and paper stock.

In the pulp and paper industry the invention is especially well adapted for the removal from a liquid suspension containing paper-making material of such unwanted impurities or foreign matter as sand particles originating from the grindstones used in the manufacture of mechanical pulp, heavy grit frequently introduced into the paper pulp with clay or other loading materials, chunks of woody material or sawdust which are small enough to pass through the screen customarily used in the paper industry, and such impurities or foreign substances as have a specific gravity greater than that of water.

The materials and substances referred to are some of those found in pulp and paper stock while other substances and materials are found in other liquids and such materials as are not wanted and are to be removed may be generally classified as foreign matter or substances for the purposes of disclosure.

While the removal of grit, sand, and other impurities and foreign matter from paper pulp and stock is more difficult than to remove the same or similar materials from otherwise clear water, the invention for purposes of disclosure will pertain to the pulp and paper industry where it is necessary and desirable to free the paper-making material of foreign matter or impurities to a high degree.

In the manufacture of pulp and paper among the classes of undesirable materials or foreign substances which must be removed there is one class which includes heavy materials such as sand, grit, ashes, pipe-scale, etc. Another class consists of bundles or bunches of fibers, portions of knots, sawdust, etc., all of which tend to be slightly more heavy than the properly classified pulp fibers.

Heretofore, to remove the foreign materials, various devices and expedients have been employed. For instance, there have been used, on the one hand, long shallow settling troughs with riffles through which the dilute pulp suspension is flowed at low velocities, and on the other, extremely high speed centrifugal separator apparatus. The first not only requires a large amount of floor space but a partial degree only of separation is possible. The riffle spaces become filled with settled pulp so that after a short period of operation these troughs must be disconnected from service at intervals, and drained, with the consequent loss of good pulp which has settled out along with the heavy material.

The high speed centrifugal apparatus not only requires expensive and accurately constructed machinery and the provision of considerable power for operation, but frequent manual attention is required in shutting down and removing the accumulated heavy materials with a similar loss of good pulp at such times. At best both forms of apparatus are costly and their operation is expensive and intermittent.

While other forms of apparatus have been used in the pulp and paper industry for a more or less continuous operation, and not requiring as great an amount of floor space of the "gravity" or settling trough type, or the heavy expensive machinery of the "centrifugal separator" type, the liquid pulp must be delivered to these devices at considerable pressure which is objectionable from a cost and equipment standpoint.

According to this invention, it has been found that a stream of liquid or liquid in motion will convey or hold in suspension materials of a greater specific gravity than the liquid and that the size or density of the materials so held varies according to the linear velocity of the moving liquid, wherefore the lower the velocity the less dense the particles carried by the liquid. Paper-making fibers suspended in water are of slightly greater specific gravity than the water and of less specific gravity than the foreign, unwanted substances referred to. It is a special feature of this invention therefor to cause the liquid containing the paper-making material to flow in such a way or at such a velocity that the paper-making fibers are carried in suspension or in other words at such a velocity that the heavier foreign substances are freed or released so as to be separated from the liquid.

The novel features of the invention are accomplished in a broad way by delivering paper making material and the like such as a liquid in which fibers are suspended to the lower portion of a cylindrical vessel at such a head as will cause the liquid to circulate around and upwardly of the vessel sufficiently to cause the fibers to be carried upwardly while foreign matter is released from suspension and discharged from the lower side of the vessel.

The various novel features and advantages of the invention will be hereinafter more fully referred to in connection with the accompanying description of the present preferred form thereof with reference to the drawings, wherein.

Figure 1:
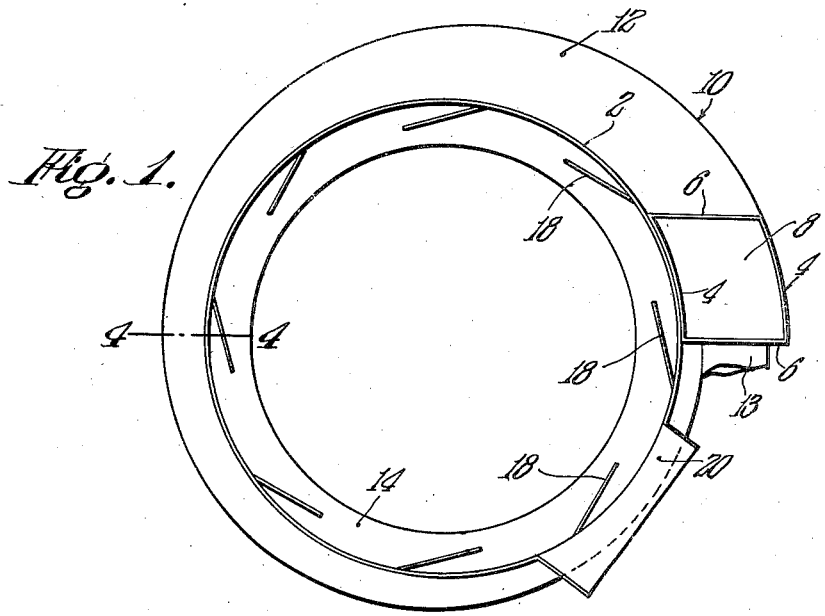
Fig. 1 is a plan view of an apparatus embodying the novel features of the invention and is adapted for carrying out the novel method.
Figure 2:
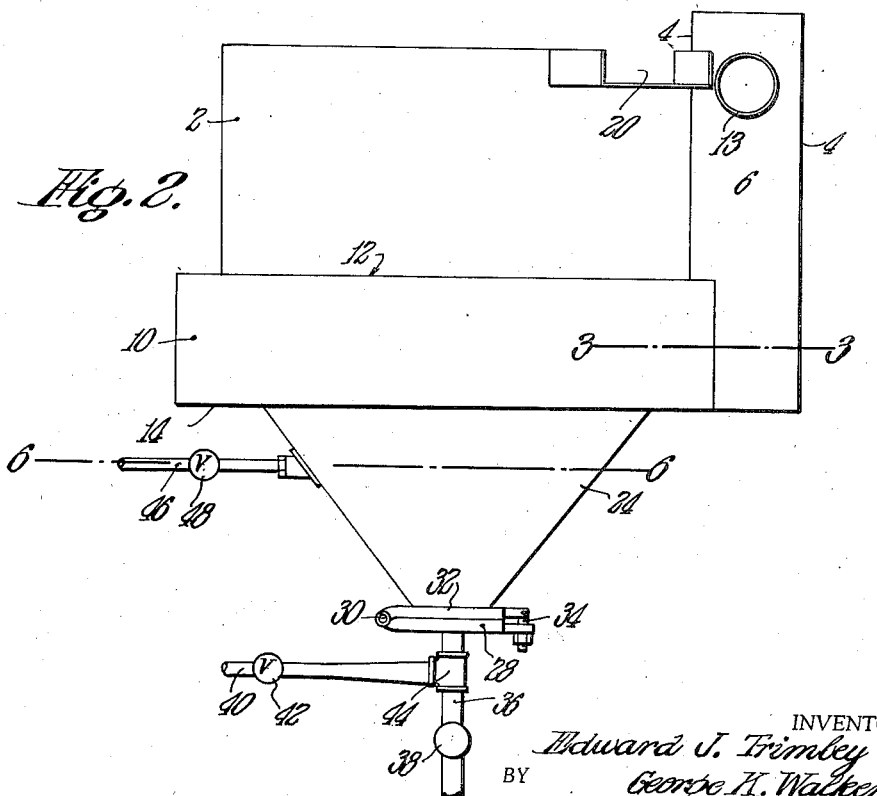
Fig. 2 is a side elevational view of the apparatus shown in Fig. 1.

Referring now to the drawings more in detail, the invention will be fully described.

A main chamber 2 is provided which is preferably in the form of a vertically disposed cylinder, as represented. Vertical side walls 4 and end walls 6 are provided at a side of the chamber 2 to form a vertically disposed inlet chamber 8. An inlet or inlets such as 13 is provided for delivering paper-making material into the chamber 8, as shown. The inlet 13 or plural inlets if used may be provided in the various walls as may be desired.

A curving vertically disposed side wall 10 is arranged around and spaced from the side wall of the main chamber in such a way that in conjunction with said wall and upper and lower walls 12 and 14 there is formed a gradually narrowing or tapering circular inlet passageway 11 around the main cylinder leading from the lower side of the inlet chamber 8.

Figure 3:
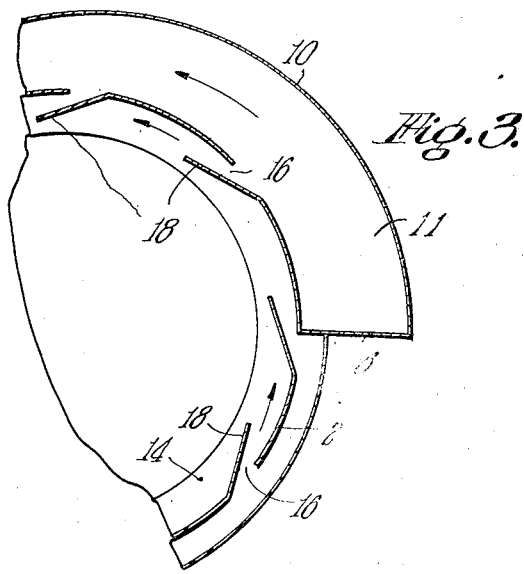
Fig. 3 is a sectional plan view on the line 3—3 of Fig. 2.
Figure 4:
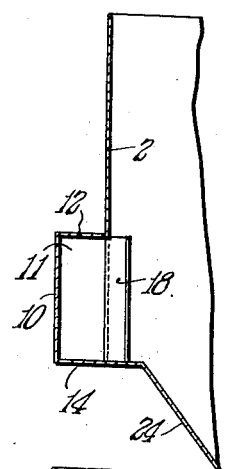
Fig. 4 is a sectional elevational view on the line 4—4 of Fig. 1.

A plurality of openings or ports are provided in the lower portion of the wall of the main chamber which are represented by 16. These are preferably equal in height to the height of the inlet passageway or the wall 10 and plate members 18 are provided which project or extend from one side of the openings 16 to a point beyond the other side thereof, as shown in Fig. 3. Plates may be extended past the openings in an opposite direction, if desired, and in some cases the plates may be eliminated. In other cases, they will be of advantage as functioning to give the liquid the desired circular motion as it enters the main chamber.

As paper-making material such as liquid having fibers suspended therein is delivered into the vertical chamber 8 it flows therefrom around through the inlet passageway and through the ports 16 into the main chamber to set up and maintain a circular motion or flow. The ports are constructed and arranged so that the liquid is caused to move circularly of the main chamber and upwardly thereof more or less spirally to carry the paper-making fibers also upwardly. The rate of travel or flow of the liquid is preferably such that the paper-making fibers are held in suspension while heavier substances, or unwanted foreign matter is released so that it settles or moves downwardly.

An outlet 20 at the upper side of the main chamber is provided and from this the liquid is conducted by any suitable means to the papermaking apparatus. This outlet may be disposed as may be desired to suit conditions and, of course, there may be plural outlets if desired.

The plates 18 and ports may vary in number and size and their arrangement may be as desired all to the end that the liquid flows from the inlet passageway into the main chamber and therearound and upwardly. The inlet 13 may be positioned to provide such a head as will create such a velocity of the liquid as will cause the fibers to be carried spirally upwardly as described, while heavier, unwanted foreign matter is released so that it moves downwardly toward and into a lower conical chamber formed by wall 24.

Figure 5:
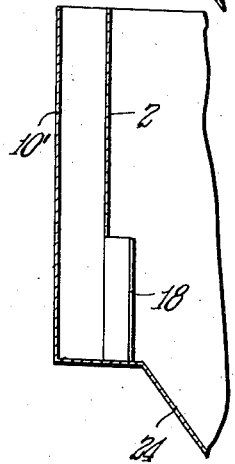
Fig. 5 is a similar view showing a modified form of the invention.

According to the modification of the invention shown in Fig. 5 an outer curving wall 10' which corresponds to wall 10 previously described, may extend upwardly so that it is in height approximately equal to that of wall 2. This wall 10' may be more or less in height and in some cases, may be desired in lieu of wall 10 to provide an inlet passageway of considerable depth which is open at its upper side so that foam and the like may be removed from the liquid at the top. Also an open top passageway may be desirable to facilitate cleaning of the apparatus.

At the lower end of the lower conical chamber there may be a dumping gate 28 pivoted at 30 to a plate 32. The gate may be held in closed or non-dumping position by a swivel bolt 34, all as shown. This gate 28 may be opened to facilitate cleaning of the apparatus when desired.

A discharge pipe 36 is connected to the gate 28 which may have a control valve 38 therein to control the rate of discharge. A water pipe 40 having a valve 42 therein is connected as by a T 44 to the pipe 36. According to the preferred form of the invention the pipe 40 is enlarged at or adjacent its connection with the pipe 36. By means of pipe 40 and valve 42 it is possible to deliver a controlled flow of water into the lower chamber as may be desired.

Figure 6:
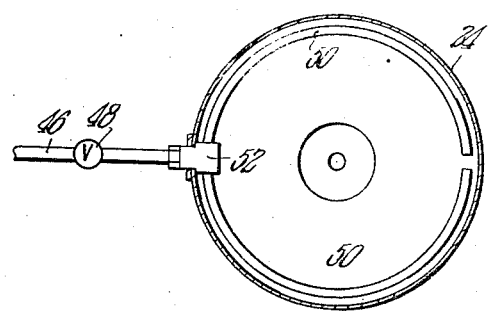
Fig. 6 is a sectional plan view on the line 6—6 of Fig. 2.
Figure 7:
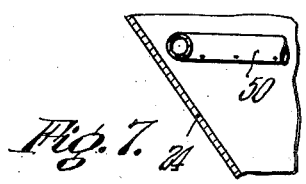
Fig. 7 is an enlarged view to show certain features of construction.

A pipe 46 for water is provided which is controlled by a valve 48. This pipe 46 leads into the lower chamber at a point above the lower end thereof and a circular pipe or pipes 50 connected thereto as by a fitting 52 are arranged around the wall 24, as shown in Fig. 6. The pipe or pipes 50 are provided with spaced outlets or discharge ports in the lower portions or sides thereof for discharging relatively small streams or jets in a downward direction. These pipes 50 may be called spray pipes and may be disposed as desired.

As liquid is delivered to chamber 8 it flows from the lower side thereof into and around inlet passageway 11 and through ports 16 into the main chamber. The ports are arranged so that the liquid is under such a head as to cause it to move or flow circularly of the main chamber at such a rate or velocity that it will carry in suspension the wanted material such as paper-making fibers, while the velocity is such that unwanted or heavier foreign materials are released. In this way the paper-making fibers are carried upwardly while the foreign material settles into the lower chamber.

The valve 38 is manipulated to allow the desired flow of discharge which carries the foreign materials and water is admitted through either one or both of pipes 40 and 46 at such a rate as may be desired. Water thus admitted may be controlled so that it does not interfere at least with the circulatory upward flow of the liquid in the main chamber and in some cases may be availed of to enhance such flow. Where the water delivered into the lower chamber is slightly greater than the amount of the discharge the upward movement of the liquid in the main chamber is enhanced and there is a tendency for adhering fibers and foreign matter to be separated so that fibers are not carried out the discharge. In any event, whatever may be the specific effect or function of water admitted through pipes 40 and 46 it has been found to be desirable in many instances.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What it is desired to claim and secure by Letters Patent of the United States is:

1. The combination in apparatus for separating foreign matter from liquid having in suspension paper-making fibers of a cylindrical vessel having upwardly extending vertical side walls and a lower inlet arranged and adapted to deliver a stream of liquid tangentially into the lower portion of the vessel at a distance downwardly from the upper side thereof and an upper outlet for said liquid, a vertically disposed receiving chamber for liquid at a side of said vessel connected to said inlet, and a lower wall for said vessel arranged in the form of an inverted cone forming a settling chamber having a discharge substantially centrally thereof.

2. The combination in apparatus for separating foreign matter from liquid having in suspension paper-making fibers of a cylindrical vessel having upwardly extending vertical side walls and a plurality of lower inlets arranged and adapted to deliver liquid tangentially into the lower portion of the vessel at a distance downwardly from the upper side thereof and an upper outlet for said liquid, a vertically disposed receiving chamber for liquid at a side of said vessel connected to said inlets, and a lower wall for said vessel arranged in the form of an inverted cone forming a settling chamber having a discharge substantially centrally thereof.

3. The combination in apparatus for separating foreign matter from liquid having in suspension paper-making fibers of, a cylindrical member having upwardly extending vertical side walls and a lower wall in the form of an inverted cone co-operating with said side walls to provide a main chamber and a lower settling chamber, the cylindrical member having an upper outlet at a side thereof and spaced cut-away portions at its lower side forming spaced inlets, the lower portion of the cone having a discharge outlet, wall members at the side of the cylindrical member arranged relative to provide a passageway to said inlets for directing liquid thereinto adjacent an end thereof whereby it moves circularly and upwardly, and means for directing fluid into said settling chamber above said discharge.

4. The combination in apparatus for separating foreign matter from liquid having in suspension paper-making fibers of, a cylindrical member having a lower wall connected thereto in the form of an inverted cone co-operating therewith to provide a main chamber having vertical walls and a lower settling chamber having an inclined lower wall, the cylindrical member having an upper outlet at a side thereof and spaced cut-away portions at its lower side forming separate inlets, the lower portion of the cone having a discharge outlet, wall members outside the side of the cylindrical member arranged to provide a tapering passageway to said inlets for directing liquid therethrough into said main chamber whereby said liquid moves circularly and upwardly therein, and means for directing fluid into said settling chamber above said discharge.

5. The combination in apparatus for separating foreign matter from paper making material of, a cylindrical member having vertical side walls and a lower wall in the form of an inverted cone providing an upper main chamber and lower settling chamber, the cylindrical member being provided with lower spaced inlets adjacent above the settling chamber and an outlet at the upper side thereof, the settling chamber provided with a discharge outlet, means forming a closed tapering passageway around and outside the lower portion of the cylindrical member from which said inlets extend, means forming a vertically disposed inlet chamber at the larger end of said inlet passageway and extending upwardly of and outside said cylindrical member, and means for admitting fluid into the settling chamber.

6. The method of separating from a liquid in which relatively light wanted paper-making particles are suspended certain unwanted relatively heavier particles which consists in, directing a continuous stream of said liquid tangentially into the lower side of a cylindrical vessel to cause said liquid to flow circularly and upwardly of the vessel and the velocity thereof being such that the liquid flows relatively slowly and sufficiently to hold the wanted particles in suspension and carry them upwardly and not sufficiently to hold the unwanted particles but to release them whereby they move downwardly of the vessel.

7. The method of separating from a liquid in which relatively light wanted paper-making particles are suspended certain unwanted relatively heavier particles which consists in, directing a continuous stream of said liquid tangentially into the lower side of a cylindrical vessel to cause said liquid to flow circularly and upwardly of the vessel and the velocity thereof being such that the liquid flows relatively slowly and sufficiently to hold the wanted particles in suspension and carry them upwardly and not sufficiently to hold the unwanted particles but to release them whereby they move downwardly of the vessel, and in introducing an additional small amount of liquid into the lower side of the vessel to assist the circular upward flow of the liquid.

8. The method of separating relatively heavy foreign unwanted particles from paper making stock including water in which lighter paper making fibers are suspended which consists in, directing a continuous stream of stock tangentially into the lower side of an upwardly extending cylindrical vessel to cause the said stock to flow circularly and upwardly of the vessel at a certain rate of flow, said certain rate of flow being relatively slow and at a velocity only sufficient to hold the paper making fibers in suspension and carry them upwardly of the vessel and not sufficient to hold the foreign particles in suspension whereby they are released and move downwardly of the vessel.

9. The method of separating relatively heavy foreign unwanted particles from paper making stock including water in which lighter paper making fibers are suspended which consists in, directing a continuous stream of stock tangentially into the lower side of an upwardly extending cylindrical vessel to cause the said stock to flow circularly and upwardly of the vessel at a certain rate of flow, said certain rate of flow being relatively slow and at a velocity only sufficient to hold the paper making fibers in suspension and carry them upwardly of the vessel and not sufficient to hold the foreign particles in suspension whereby they are released and move downwardly of the vessel, and in introducing an additional small amount of water into the lower side of the vessel to assist the circular upward flow of the liquid.

10. Apparatus for separating from a liquid containing relatively light wanted particles other relatively heavier unwanted particles comprising in combination, a cylindrical vessel having a lower wall in the form of an inverted cone providing an upper main chamber and a lower settling chamber, means at one side of the cylindrical vessel forming a vertically disposed inlet chamber having an outlet at one side of its lower end, wall members extending from said outlet around said vessel arranged to provide a closed passageway gradually narrowing from said outlet to its termination adjacent the other side of the chamber, said vessel having spaced inlet openings in the side wall thereof in communication with said passageway, and plate members disposed in vertical planes and extending inwardly at a side of said openings of the chamber and over said openings in a general direction corresponding to that in which the passageway gradually narrows.

EDWARD J. TRIMBEY.
GEORGE K. WALKER.